J. B. SCHENCK.
CUT-OFF VALVE GEAR.

No. 12,729.            Patented Apr. 17, 1855.

UNITED STATES PATENT OFFICE.

JOHN B. SCHENCK, OF ANSONIA, CONNECTICUT.

CUT-OFF-VALVE GEAR.

Specification of Letters Patent No. 12,729, dated April 17, 1855.

*To all whom it may concern:*

Be it known that I, JOHN B. SCHENCK, of Ansonia, in the county of New Haven and State of Connecticut, have invented a new and useful Improvement in the Slide-Valve Gear of the Steam-Engine; and I do hereby declare that the following is a full, clear, and exact description of the same, reference being had to the accompanying drawings, forming part of this specification, in which—

Figure 1:
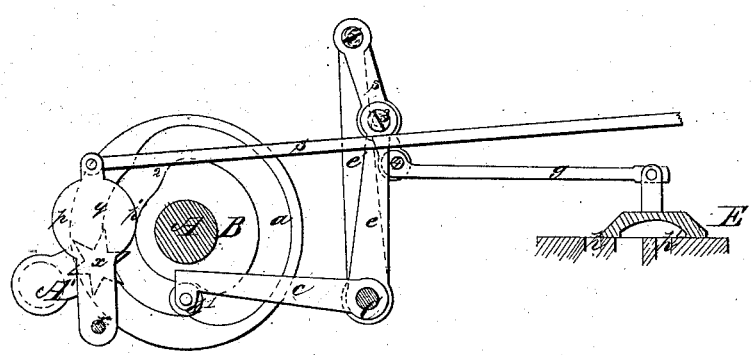
Figure 2:
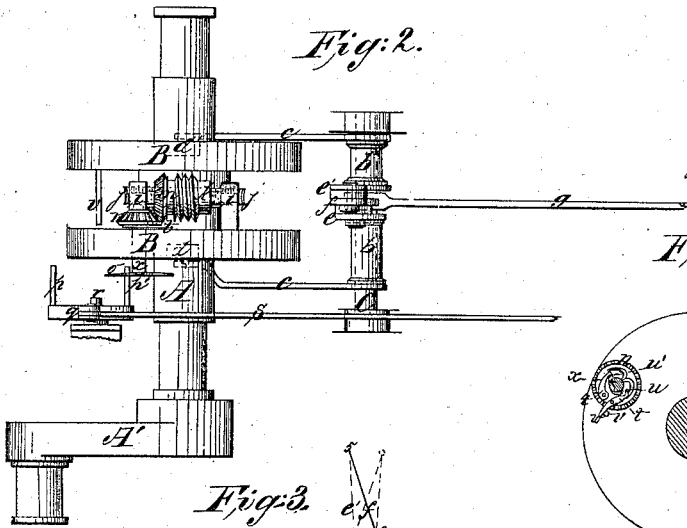
Figure 4:
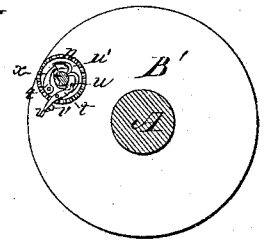
Figure 3:
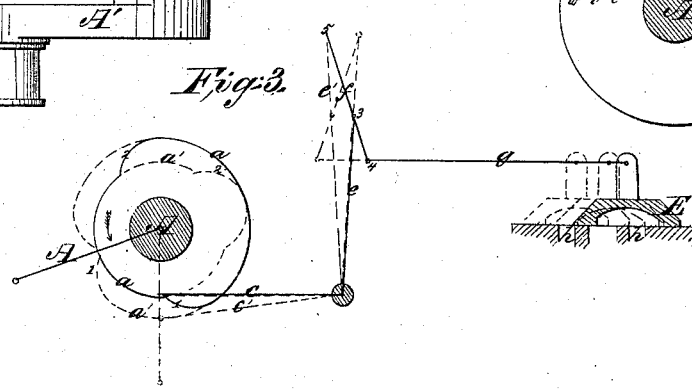

Figure 1 is a side view of my improved valve gear; Fig. 2, a plan of the same; Fig. 3, a diagram, illustrative of its movements; Fig. 4, a detached view of a part of the mechanism.

Similar letters of reference indicate corresponding parts in the several figures.

The principal object of this invention is to effect the cutting off of the steam at any point in the stroke of the piston, by means of a single slide valve, by such a movement as will leave a free exhaust till the end or very near the end of the stroke and to connect the valve with a governer so that it shall be variable in the most perfect degree under the control thereof either to allow the full head of steam to act during nearly the whole of the stroke of the piston or to cut it off at the very earliest desirable point.

To enable those skilled in the art to make and use my invention, I will proceed to describe its construction and operation.

A represents the crank shaft of the engine and $A^1$ the crank.

B, is a cam firmly secured to the shaft for the purpose of moving the valve to open the ports. This cam has a groove $a$, in its face, the form of which is that of two arcs constituting equal proportions of circles one having a greater radius than the other and the two being united by steps or offsets. The effect of this form is to give two quick throws at regular intervals during every revolution of the crank shaft; and the position of the cam upon the crank shaft is such that the throw is always given as the crank passes the center.

$B^1$ is a cam having a groove $a^1$, precisely similar in form to that in the cam B. This cam is for the purpose of moving the valve to cut off the steam and is loose or movable upon the crank shaft.

C, is a shaft which corresponds with the way shaft of other engines but it is here supposed to be fixed to form a bearing for two loose sleeves $b$, $b^1$. The former of these sleeves carries one lever arm $c$, with a roller $d$, attached to it to run in the groove of the cam B, and another lever arm $e$; and the latter carries one lever arm $c^1$, corresponding with $c$, and having a roller $d^1$, to run in the groove of the cam $B^1$, and another lever arm $e^1$, which is longer than the arm $e$. The lever arms of either sleeve stand at the same angles to each other as those of the other. The ends of the arms $e$, and $e^1$, are connected by a lever $(f)$, to which is attached the valve rod $g$. The slide valve E, has a lap and does not differ in any material degree from the lap valves now in use.

The movement given to the valve E, is illustrated in the diagram, Fig. 3, where the groove $a$, of the cam B, is represented by a bold line and the groove $a^1$, of the cam $B^1$, by a dotted line, for the sake of distinction. The lever arms $c$, $e$, and $c^1$, $e^1$, are represented by lines corresponding with their respective cams. The cam $B^1$, is there shown in such a position relatively to the cam B, as would cause the steam to be cut off at about half stroke. The crank shaft rotates in the direction of the arrow. The position represented in black is when the engine has just passed the center and the valve has just been moved to open the steam port $h$, by the action of the step 1, of the cam B. The arms $c$, $e$, and $c^1$, $e^1$, and the valve all remain stationary in this position till the crank shaft moves far enough for the step 1, of the cam $B^1$, to come into operation and raise the arm $c^1$, and throw the arm $e^1$, to the position shown in red color. This movement of the arm $e$, acting upon the lever $f$, whose fulcrum is then the end of the arm $e$, brings the valve to the position shown in red, closing the port $h$, but still leaving the port $h^1$, open to the exhaust. At the termination of this movement the cam B is in the position shown in red and the cam $B^1$, in the position in which B, is represented in black. The movement of the crank shaft continues without any further movement of the lever arms or valve until the crank passes the center when the step 2, of the cam B, comes into operation and depresses the arm $c$, and throws the arm $e$, into the position shown in blue. This movement of the arm $e$, acting upon the lever $f$, whose fulcrum is then the end of the arm $e^1$, moves the valve to the position shown in blue and opens the port $h^1$, to the steam and the port $h$, to the exhaust. It will be seen that the valve makes two distinct movements to complete its stroke, viz: first a short movement to close the port previously open, to cut off the steam therefrom without checking the exhaust from the other port, and second, a longer movement to open the former port to the exhaust and at the same time open the latter to the steam, both movements being effected quickly and the valve being stationary for an interval between the two movements, as it is also between the time of closing the port to cut off and the time of opening the opposite port. Instead of making the arm $e^1$, longer than $e$, the arm $e$ may be the longest, but in that case, the connection of the valve rod with the lever $f$, must be between the ends of the arms $e$, and $e^1$, and the same movement as that described may be effected. There must always however be a proper proportion between the arms $e$, $e^1$, and the arms of the lever $f$, to give the movements of the valve the proper length.

It may be easily understood that the time of cutting off the steam may be varied by moving the cam $B^1$, on the shaft so that it may act sooner or later after the cam $B$, and in order to govern the engine by the slide valve, I employ the means which I have shown, of varying the position of the cam to suit the performance of the engine and which are described as follows: $j$, Fig. 2 is a worm wheel cast with or secured to the movable cam $B^1$, concentric with the crank shaft, and $k$ is an endless screw which is supported in bearings $l$, $l$, attached to the inner surface of the fixed cam $B$, and gears with the said worm wheel $j$. The endless screw carries a bevel wheel $m$, which gears with a bevel wheel $n$, on the arbor $x$, of a finger wheel $o$, the said arbor being fitted to turn freely in a bearing near the periphery of the cam parallel with the axis thereof. This finger wheel in revolving with the cam passes during every revolution between two pins $p$ and $p^1$, attached to an arm $q$, which is arranged to rock on a fixed pivot $v$, secured somewhere on the framing of the engine. This arm $q$, is connected by a rod $s$, with a governor. While the engine is going at the requisite speed, the governor holds the arm in such a position that the finger wheel passes between the pins $p$, $p^1$, without touching them, and therefore the relative positions of the cams are not changed; but if the engine goes too fast, it draws the arm in such a direction that the pin $p$, may be struck by the fingers of the wheel and may impart a movement to the wheel upon its axis in such a direction that the action of the bevel gears, endless screw, and worm wheel will advance the cam $B^1$, and thus cause it to act sooner after the cam $B$, and cut off the steam earlier in the stroke; or if the engine goes too slow it draws the arm in the opposite direction so that the fingers may strike the opposite pin $p^1$, and by thus imparting an opposite movement to the finger wheel draw back the cam $B^1$, to act not so soon after the cam $B$, and thus cut off later in the stroke. The distance which the cam $B^1$, is moved upon the shaft by the action of the pin $p$ or $p^1$, on the finger wheel during every revolution, depends upon the depth the pin is thrown between the fingers, consequently a great change in the condition of the governor, produces a rapid alteration in the cut off, and the alteration diminishes to the least movement that may be desirable.

In order that when the tendency to increase the speed of the engine may not cause the cam $B^1$, to be moved farther back than is necessary to allow the valve to remain open full stroke, the bevel gear $n$, is not secured fixedly to the arbor of the wheel $o$, but is only attached by two spring pawls $t$, $t^1$, attached to it, to engage with ratchet teeth $u$, $u^1$, on the shaft. The pawl $t$, is made with a tail $w$, which, when the cam $B^1$, is moved back as far as desirable, comes in contact with a stud or stop $v$, secured to the cam $B^1$, and thereby causes the pawl to be disengaged from its ratchet tooth, so as to allow the finger wheel and arbor to rotate without the bevel wheel. This movement of the arbor is not prevented by the other pawl, as that is only active in the opposite direction.

Having thus fully described my invention, I will proceed to state what I claim and desire to secure by Letters Patent.

I do not, of themselves, claim the employment of two cams or eccentrics applied to a single slide valve, the one to open the steam ports and the other to close them to cut off the steam. Neither do I claim making one of the said cams or eccentrics movable for the purpose of varying the cut off; but

I claim—

1. Connecting the slide valve with a lever $f$, which is also connected at different points with two arms $e$, $e^1$, of unequal length working side by side and receiving motion substantially as herein described from separate cams on the crank shaft of the engine or some other shaft having a corresponding motion therewith, the whole operating to give the valve a double movement as herein set forth.

2. Effecting the connection between the finger wheel $o$, and the bevel wheel $n$, or its equivalents through which the said finger wheel transmits the movements of the governor to the cut off cam $B^1$, by means of pawls $t$, $t$, acting upon ratchet teeth $u$; and providing a stud or stop *v*, on the opposite cam to that which carries the finger wheel, for the purpose, when the cut off cam arrives in position to give full steam for the whole stroke of the piston, of liberating the pawl by which the motion is transmitted in the direction for retarding the operation of the cut off cam, and thereby rendering it inoperative, substantially as herein described.

JOHN B. SCHENCK.

Witnesses:
 THOS. C. SERVOSS,
 H. W. HUBBARD.